United States Patent
Washam et al.

(10) Patent No.: US 8,125,914 B2
(45) Date of Patent: Feb. 28, 2012

(54) SCALED ETHERNET OAM FOR MESH AND HUB-AND-SPOKE NETWORKS

(75) Inventors: Benjamin D Washam, Ottawa (CA); Andrew Dolganow, Kanata (CA); Lei Qiu, Pleasanton, CA (US)

(73) Assignee: Alcatel Lucent, Paris (FR)

( * ) Notice: Subject to any disclaimer, the term of this patent is extended or adjusted under 35 U.S.C. 154(b) by 175 days.

(21) Appl. No.: 12/362,328

(22) Filed: Jan. 29, 2009

(65) Prior Publication Data

US 2010/0188983 A1 Jul. 29, 2010

(51) Int. Cl.
*G01R 31/08* (2006.01)
(52) U.S. Cl. .................................................. 370/245
(58) Field of Classification Search ............... 370/241.1, 370/245, 249, 254
See application file for complete search history.

(56) References Cited

U.S. PATENT DOCUMENTS

| | | | |
|---|---|---|---|
| 7,688,742 B2 * | 3/2010 | Sridhar et al. .............. 370/241.1 |
| 7,765,294 B2 * | 7/2010 | Edwards et al. .............. 709/224 |
| 7,768,928 B2 * | 8/2010 | Harel et al. ................ 370/241.1 |
| 7,782,761 B2 * | 8/2010 | Salam et al. .................. 370/216 |
| 2006/0056414 A1 * | 3/2006 | Elie-Dit-Cosaque et al. 370/392 |
| 2006/0153220 A1 * | 7/2006 | Elie-Dit-Cosaque et al. 370/432 |
| 2006/0159008 A1 * | 7/2006 | Sridhar et al. ................ 370/216 |
| 2007/0014290 A1 * | 1/2007 | Dec et al. ....................... 370/390 |
| 2007/0140126 A1 * | 6/2007 | Osswald et al. ............ 370/236.2 |
| 2008/0016402 A1 * | 1/2008 | Harel et al. ....................... 714/43 |
| 2008/0049628 A1 * | 2/2008 | Bugenhagen ................ 370/244 |
| 2008/0112331 A1 * | 5/2008 | Long et al. .................... 370/245 |
| 2008/0151780 A1 * | 6/2008 | Suhail et al. .................. 370/254 |
| 2009/0113070 A1 * | 4/2009 | Mehta et al. .................. 709/238 |
| 2009/0158388 A1 * | 6/2009 | Sridhar et al. ..................... 726/2 |
| 2009/0201819 A1 * | 8/2009 | Mizutani et al. ............ 370/241.1 |
| 2009/0225661 A1 * | 9/2009 | Salam et al. .................. 370/242 |
| 2009/0234969 A1 * | 9/2009 | Mohan et al. ................. 709/242 |
| 2009/0282291 A1 * | 11/2009 | Fitzgerald et al. .............. 714/39 |
| 2009/0285090 A1 * | 11/2009 | Allasia et al. ................. 370/221 |
| 2010/0169718 A1 * | 7/2010 | Tausanovitch et al. ......... 714/49 |
| 2010/0172238 A1 * | 7/2010 | Saltsidis et al. ............... 370/228 |
| 2010/0182902 A1 * | 7/2010 | Saltsidis ........................ 370/225 |
| 2010/0188983 A1 * | 7/2010 | Washam et al. ............... 370/245 |

OTHER PUBLICATIONS

ITU-T Study Group 15, Series G: Transmission Systems and Media, Digital Systems and . . . ; Series Y: Global Info. Infrastructure, Inter . . . Telecom Stand G.8031/Y.1, Jun. 2006.

(Continued)

*Primary Examiner* — Kwang B Yao
*Assistant Examiner* — Jung-Jen Liu
(74) *Attorney, Agent, or Firm* — Kramer & Amado P.C.

(57) ABSTRACT

Various exemplary embodiments relate to a method and related network node including one or more of the following: configuring a maintenance domain on a first network node; configuring a maintenance association within the maintenance domain on a first network node; configuring, within the maintenance association, a local maintenance endpoint (MEP) on the first network node; and establishing a plurality of point-to-point connections within the maintenance association, each point-to-point connection established between the local MEP and a respective remote MEP on a respective network node of the plurality of network nodes using an identifier of the respective remote MEP and a Media Access Control (MAC) address of the respective remote MEP, wherein each point-to-point connection enables transmission of unicast CFM messages from the local MEP to the respective remote MEP, and the plurality of point-to-point connections are established within a single maintenance association.

18 Claims, 6 Drawing Sheets

OTHER PUBLICATIONS

IEEE Computer Society, Standard for Local and Metro Area Networks. Amend 5: Connectivity Fault Managment, IEEE std 802.1ag 2007, NY, NY.

ITU-T, Series Y: Global Info. Infrastructure, Internet Protocal Aspects and Next-Generation Networks, Telcom Stand Y.1731, Feb. 2008.

Takacs et al, "GMPLS RSVP-TE Extensions for Ethernet OAM Configuration", 2008.

Takacs et al, "OAM Configuration Framework and Requirements for GMPLS RSVP-TE", 2008.

* cited by examiner

SCALED ETHERNET OAM FOR MESH AND HUB-AND-SPOKE NETWORKS

TECHNICAL FIELD

Embodiments disclosed herein relate generally to implementation of Ethernet Operations, Administration, and Maintenance (OAM) and, more particularly, to configuration of Connectivity Fault Management (CFM) functionality.

BACKGROUND

Traditional Local Area Networks (LANs) exchange data using Ethernet, a frame-based standard that allows high-speed transmission of data over a physical line. Since its initial implementation, the Ethernet standard has rapidly evolved and currently accommodates in excess of 10 Gigabits/second. Furthermore, because Ethernet is widely used, the hardware necessary to implement Ethernet data transfers has significantly reduced in price, making Ethernet a preferred standard for implementation of enterprise-level networks.

Given these benefits, telecommunications service providers have sought to expand the use of Ethernet into larger-scale networks, often referred to as Metropolitan Area Networks (MANs) or Wide Area Networks (WANs). By implementing so-called Carrier Ethernet, service providers may significantly increase the capacity of their networks at a minimal cost. This increase in capacity, in turn, enables provider networks to accommodate the large volume of traffic necessary for next-generation applications, such as Voice over Internet Protocol (VoIP), IP Television (IPTV), and Video On Demand (VoD).

Because Ethernet evolved in the context of local area networks, however, native Ethernet has a number of limitations when applied to larger scale networks. One key deficiency is the lack of native support for Operation and Maintenance (OAM) functionality. More specifically, because network operators can typically diagnose problems in a LAN on-site, the Ethernet standard lacks support for remote monitoring of connections and performance. Without support for such remote monitoring, network operators of large-scale networks would find it difficult, if not impossible, to reliably maintain their networks.

To address the lack of native Connectivity Fault Management in the Ethernet standard, several organizations have developed additional standards describing this functionality. In particular, the International Telecommunication Union (ITU) has published Y.1731, entitled, "OAM Functions and Mechanisms For Ethernet-Based Networks," the entire contents of which are hereby incorporated by reference. Similarly, the Institute of Electrical and Electronics Engineers (IEEE) has published 802.1ag, entitled "Connectivity Fault Management," the entire contents of which are hereby incorporated by reference.

Y.1731 and 802.1ag describe a number of mechanisms used to detect, isolate, and remedy defects in Ethernet networks. For example, these standards describe the use of Continuity Check Messages (CCMs) that may be periodically transmitted by a network node throughout the network, thereby informing other nodes of its status. The standards describe similar mechanisms for verifying the location of a fault in the network.

Network operators typically configure the CFM mechanisms described in these standards such that the nodes exchange multicast messages. Thus, when a node sends a CFM message, it is typically received by multiple nodes. In some circumstances, however, it may be desirable to send a message containing information specific to a single node, rather than a group of nodes. In these instances, multicast messaging is insufficient and point-to-point unicast functionality is necessary.

Unfortunately, configuring the CFM mechanisms of Y.1731 and 802.1ag for point-to-point functionality is complex, time-consuming, and inefficient. In particular, when point-to-point functionality is required, a network operator must establish a separate maintenance association for each connection. Furthermore, the network operator must also establish a local maintenance endpoint within every maintenance association. In addition to making configuration a time-consuming, burdensome task, this configuration also requires a large amount of storage, as the network node must maintain data regarding each maintenance association and endpoint.

For the foregoing reasons and for further reasons that will be apparent to those of skill in the art upon reading and understanding this specification, there is a need for simplified configuration of point-to-point connectivity fault management in Ethernet networks.

SUMMARY

In light of the present need for simplified configuration of point-to-point connectivity fault management in Ethernet networks, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: configuring a maintenance domain on a first network node; configuring a maintenance association within the maintenance domain on a first network node; configuring, within the maintenance association, a local maintenance endpoint (MEP) on the first network node; and establishing a plurality of point-to-point connections within the maintenance association, each point-to-point connection established between the local MEP and a respective remote MEP on a respective network node of the plurality of network nodes using an identifier of the respective remote MEP and a Media Access Control (MAC) address of the respective remote MEP. Each point-to-point connection may enable transmission of unicast CFM messages from the local MEP to the respective remote MEP and the plurality of point-to-point connections may therefore be established within a single maintenance association.

It should be apparent that, in this manner, various exemplary embodiments simplify the configuration necessary to implement point-to-point Connectivity Fault Management messaging between maintenance endpoints. In particular, by allowing configuration of point-to-point connections using a unicast MAC address of the remote MEP, various exemplary embodiments reduce the amount of time and memory required to establish and maintain these point-to-point connections, while enabling the increased functionality associated with point-to-point connections.

BRIEF DESCRIPTION OF THE DRAWINGS

In order to better understand various exemplary embodiments, reference is made to the accompanying drawings, wherein.

DETAILED DESCRIPTION

Figure 1:
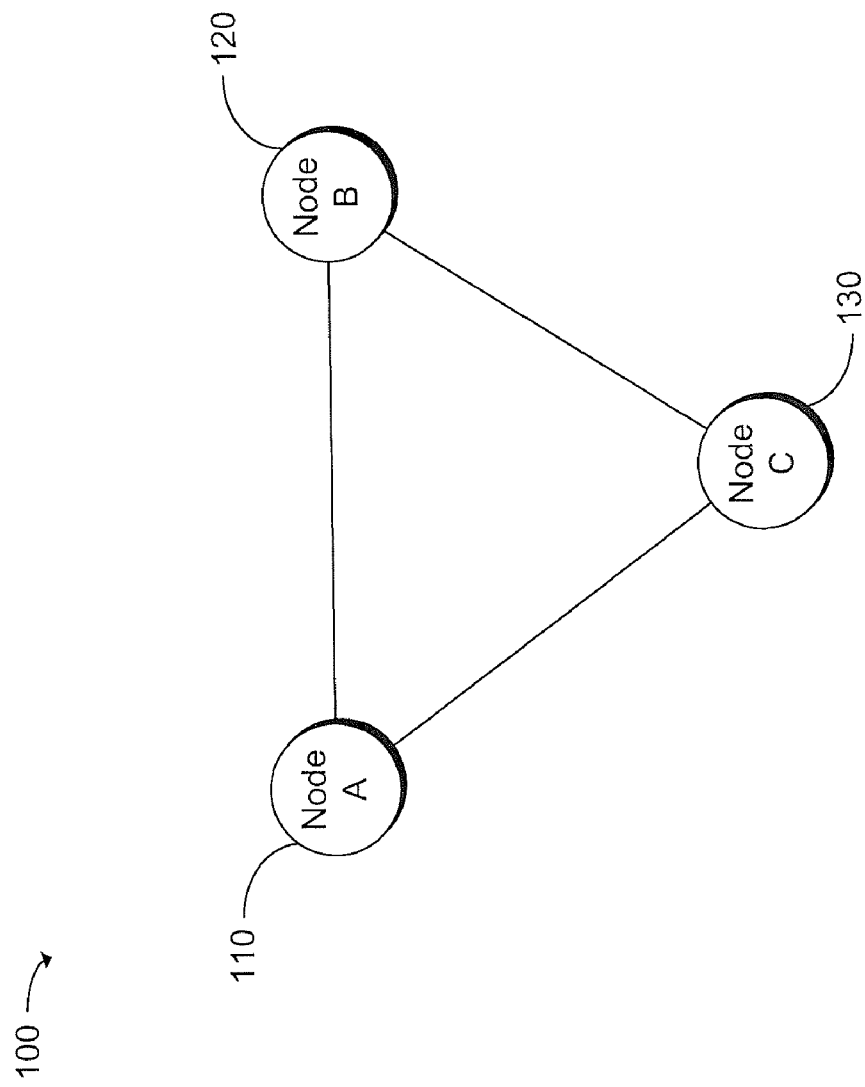
FIG. 1 is a schematic diagram of an exemplary network including three network nodes, each node including one or more maintenance endpoints.

Referring now to the drawings, in which like numerals refer to like components or steps, there are disclosed broad aspects of various exemplary embodiments.

FIG. 1 is a schematic diagram of an exemplary network 100 including three network nodes 110, 120, 130. Network 100 includes node A 110, node B 120, and node C 130, each of which may be a router, switch, or other network equipment supporting Ethernet OAM. Each node 110, 120, 130 may be configured to implement Ethernet Connectivity Fault Management. More specifically, each node 110, 120, 130 may implement fault detection, fault verification, fault isolation, and fault notification by exchanging CFM messages with the other nodes in network 100.

In order to utilize nodes 110, 120, 130 to exchange CFM messages, a series of configuration steps must be performed on each of the nodes 110, 120, 130. In particular, on each node 110, 120, 130, an operator or other entity must configure a maintenance domain, maintenance associations, local maintenance endpoints, and remote maintenance endpoints.

In some circumstances, a point-to-point connection is required between each maintenance endpoint. As an example, an operator seeking to implement Ethernet Automatic Protection Switching (APS) may require the capability to send messages including information tailored to a particular maintenance endpoint. This capability is not possible using multicast messaging, as every node 110, 120, 130 would receive the message and a given maintenance endpoint would be unable to isolate information specific to itself. As an example, if the remote defect indication (RDI) bit in the CCM PDU were being used as an indication to perform an APS switchover, a multicast message with that bit set would cause all peers to take action as opposed to just the peer the RDI bit was intended to affect.

In a typical implementation, configuring all connections within the maintenance domain as point-to-point connections requires a significant number of commands and overhead. The following example illustrates a set of pseudo-commands that could be used to configure a point-to-point maintenance connection between each pair of maintenance endpoints in the nodes of network 100.

Configuration on node 110:
  association 110-120
   remote mep 120
   local mep 110
  association 110-130
   remote mep 130
   local mep 110
 Configuration on node 120:
  association 110-120
   remote mep 110
   local mep 120
  association 120-130
   remote mep 130
   local mep 120
 Configuration on node 130:
  association 110-130
   remote mep 110
   local mep 130
  association 120-130
   remote mep 120
   local mep 130

Thus, in this example, establishing a point-to-point connection between each pair of nodes in the domain requires 3 associations and 6 MEPs. As a result, each node 110, 120, 130 must store information regarding two associations, two remote MEPs, and two local MEPs. It should be apparent that, as the desired number of point-to-point connections increases, the configuration becomes increasingly burdensome. For example, in a hub and spoke configuration, a central or "hub" node must be capable of point-to-point communication with all other "spoke" nodes. A mesh configuration is even more complex, as each node must be capable of point-to-point communication with every other node in the mesh.

According to the various exemplary embodiments, each node 110, 120, 130 may be configured to establish point-to-point connections between the nodes 110, 120, 130 using a simplified configuration process. More specifically, each node 110, 120, 130 may establish the point-to-point connections using a Media Access Control (MAC) address of the remote MEP with which a connection is to be established. The following example illustrates a set of pseudo-commands that may be used to configure a point-to-point maintenance connection between each pair of maintenance endpoints in the nodes of network 100.

Configuration on node 110:
  association 110-120-130
   remote mep 120 mac X
   remote mep 130 mac Y
   local mep 110
 Configuration on node 120:
  association 110-120-130
   remote mep 110 mac Z
   remote mep 130 mac Y
   local mep 120
 Configuration on node 130:
  association 110-120-130
   remote mep 110 mac Z
   remote mep 120 mac X
   local mep 130

Thus, in this example, establishing a point-to-point connection between each pair of nodes in the domain requires only 1 association and 3 MEPs. As a result, each node 110, 120, 130 need only store information regarding one association, two remote MEPs, and one local MEP. Furthermore, configuration of the CFM functionality is greatly simplified, as the total number of commands necessary is significantly reduced. This reduction in configuration time and memory usage is particularly evident when establishing hub-and-spoke and mesh configurations.

As evident from the above commands, the configuration of a remote MEP may be facilitated by including the MAC address of the remote MEP in the initial configuration command. Alternatively, as described in further detail herein, the MAC address of the remote MEP may be dynamically determined upon receipt of a CFM message from the remote MEP. In such embodiments, the point-to-point connection may be appropriately configured upon determination of the remote MEP's MAC address.

Upon configuration in accordance with the above-described commands, each maintenance endpoint on the respective nodes 110, 120, 130 may exchange CFM messages over the established point-to-point connections. As an example, a maintenance endpoint on node 110 may send a unicast Continuity Check Message (CCM) directly to a maintenance endpoint on node 120. This CCM message may be used to update the remote MEP regarding the status of the local MEP and, if necessary, transmit information used to implement Ethernet APS at the remote MEP.

It should be apparent that, in the foregoing description, the configuration is described in terms of three nodes 110, 120, 130 including maintenance endpoints. Network 100 may include numerous other nodes, some of which do not include maintenance endpoints. As an example, some nodes in network 100 may include maintenance intermediate points, the configuration of which will be apparent to those of skill in the art.

Figure 2:
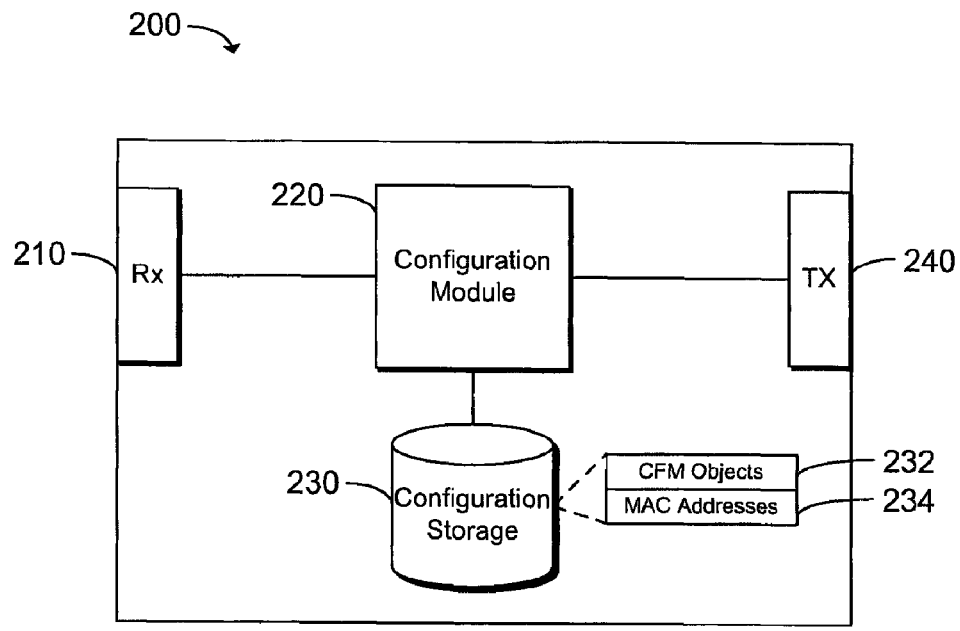
FIG. 2 is a schematic diagram of an exemplary node for use in configuring CFM in the network of FIG. 1.

FIG. 2 is a schematic diagram of an exemplary node 200 for use in configuring CFM in the network 100 of FIG. 1. Node 200 may be a router, switch, or other network equipment supporting Ethernet OAM. Node 200 may include a receiver 210, configuration module 220, configuration storage 230, and a transmitter 240.

Receiver 210 may include hardware and/or software encoded on a machine-readable storage medium configured to receive data from another network node. The hardware included in receiver 210 may be, for example, a network interface card that receives packets and other data. Thus, receiver 210 may receive CFM messages destined for a maintenance endpoint located at node 200.

Configuration module 220 may include hardware and/or software encoded on a machine-readable storage medium configured to implement CFM functionality on node 200. Thus, configuration module 220 may include a microprocessor, Field Programmable Gate Array (FPGA), or similar hardware. In addition, configuration module 220 may include a storage medium containing machine-executable instructions. In either case, this hardware may be standalone or part of a central processor (not shown) of node 200 or, alternatively, implemented in a line card or port-distributed object. Other suitable implementations will be apparent to those of skill in the art.

Configuration module 220 may be adapted to execute the instructions required to configure CFM functionality on node 200. Thus, configuration module 220 may execute instructions necessary to configure a maintenance domain, configure a maintenance association within the maintenance domain, and configure a local maintenance endpoint within the maintenance association.

When point-to-point functionality is desired, configuration module 220 may be further configured to establish point-to-point connections within the maintenance association. Thus, configuration module 220 may execute an instruction to establish a point-to-point connection between a local MEP and a remote MEP using an identifier of the remote MEP (e.g., remote maintenance endpoint identifier) and a MAC address of the remote MEP. As described in further detail above, this configuration method results in a significant reduction in configuration complexity and in the amount of memory required for storage of the configuration information, as all point-to-point connections are established within a single maintenance association.

Configuration module 220 may establish the point-to-point connection upon receipt of a command from a command line interface or through a graphical user interface, the command including the remote MEP ID and MAC address. Alternatively, configuration module 220 may dynamically establish the point-to-point connection upon discovering the MAC address of the remote MEP based upon receipt of a CFM message from the remote MEP. In particular, configuration module 220 may extract the MAC address from a PDU used to transmit the CFM message from the remote MEP to a local MEP on node 200.

Upon establishment of a point-to-point connection between a local MEP and a remote MEP, the point-to-point connection may be used to transmit unicast CFM messages from the local MEP to the remote MEP. Thus, configuration module 220 may generate a CFM message for unicast transmission to the remote MEP including at least one field specific to the remote MEP. As an example, configuration module 220 may generate a Continuity Check Message including the value "1" in the Remote Defect Indication (RDI) field, indicating that a link used by the remote MEP has failed. Upon receipt of the CCM message, the remote MEP may respond appropriately based on the knowledge that the message is tailored for the remote MEP. For example, the remote MEP may switch to a protection link upon recognition of the RDI bit in the CFM message. Other suitable information for unicast transmission in the Continuity Check Message will be apparent to those of skill in the art.

Configuration storage 230 may be maintained on a machine-readable storage medium and includes all configuration information used by configuration module 220. Thus, configuration storage 230 may include a database, linked-list, array, or any other data structure or arrangement suitable for storage of configuration information.

Configuration storage 230 includes CFM objects 232, which maintain information regarding all domains, associations, local MEPs, and remote MEPs used by node 200. Configuration storage 230 further includes MAC addresses 234, which indicate the MAC address of each remote MEP with which a point-to-point connection has been established. Each MAC address may be stored in MAC addresses 234 in association with a remote MEP ID identifying the remote MEP. Upon the initial configuration of CFM functionality, configuration module 220 may update CFM objects 232 to reflect the configuration information of the domain, association, local MEP, and remote MEPs used by node 200, while updating MAC addresses 234 to indicate the corresponding MAC addresses of the remote MEPs.

Transmitter 240 may include hardware and/or software encoded on a machine-readable storage medium configured to transmit data to another network node. The hardware included in transmitter 240 may be, for example, a network interface card that transmits packets and other data. Thus, transmitter 240 may transmit CFM messages destined for a remote MEP over a point-to-point connection. As an example, transmitter 240 may send a Continuity Check Message using a format described in further detail below with reference to FIG. 3.

Figure 3:
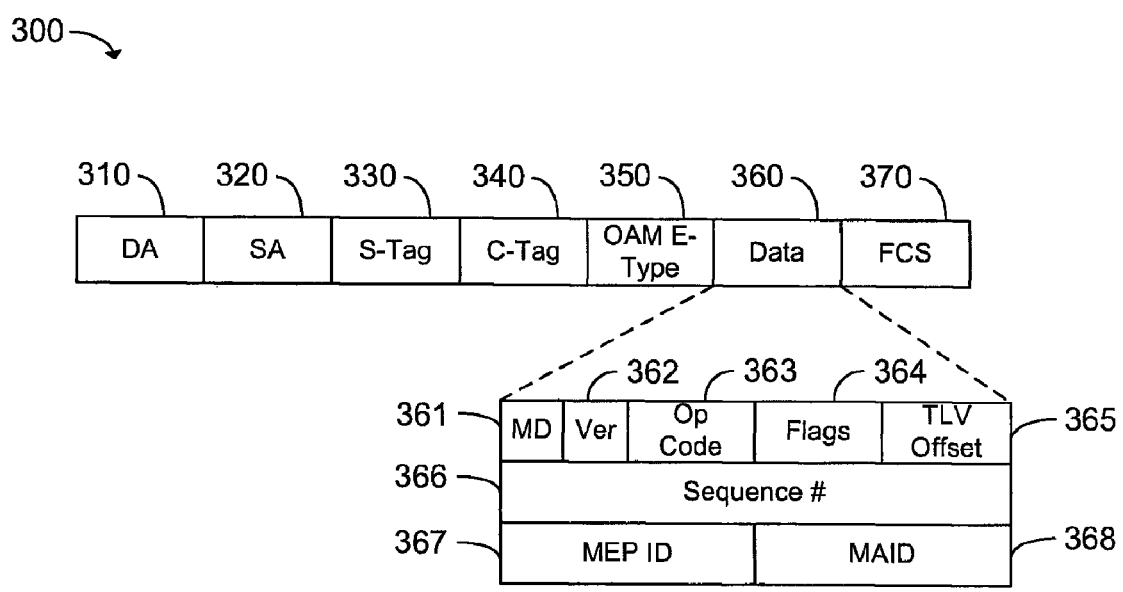
FIG. 3 is a schematic diagram of an exemplary Ethernet frame used to transmit CFM messages by the node of FIG. 2.

FIG. 3 is a schematic diagram of an exemplary Ethernet frame 300 used to transmit CFM messages by node 200 of FIG. 2. Frame 300 includes a destination address field 310, a source address field 320, a service tag field 330, a customer tag field 340, an OAM Ethertype field 350, a data payload 360, and a frame check sequence field 370.

Destination address field 310 includes six bytes used to indicate the destination MAC address of frame 300. Source address field 320 includes six bytes used to indicate the source address of frame 300. In embodiments where node 200 dynamically populates the destination MAC address of a remote MEP, node 200 may determine the MAC address by extracting the value from source address field 320 upon receipt of a message from the remote MEP.

Service tag field 330 may be appended to frame 300 at ingress to a service provider network and is used to separate and identify traffic through the network. Optional customer tag field 340 may be used to include the Virtual Local Area Network (VLAN) tag of a customer associated with frame 300. OAM Ethertype field 350 may be set to a predefined value indicating that the frame is transmitted in accordance with a particular protocol. As an example, the value may be set to "0x8902" to indicate that the frame complies with IEEE 802.1ag.

Data payload 360 may include a plurality of fields specific to the CFM message transmitted in frame 300. Fields 361, 362, 363, 364 are included in all CFM headers, but may include information specific to the type of CFM message. Maintenance domain field 361 may include an integer identifying the maintenance domain level of the frame 300. Version field 362 may include a protocol version number, which may be modified to reflect extensions to the underlying protocol. OpCode field 363 may be used to identify the type of message transmitted by frame 300. As an example, when frame 300 includes a Continuity Check Message, the value of OpCode field 363 may be set to "1."

Flags field 364 may include information specific to the type of CFM message, as identified by OpCode field 363. As an example, when OpCode field 363 is "1," indicating that the message is a CCM, flags field 364 may be broken into three components. A first component may contain the Remote Defect Indicator bit, as described in further detail above. A second component may include a CCM interval, indicating a transmission interval for the CCM messages. Finally, a third component may be a number of Reserved bits consisting of the remaining bits in flags field 364.

TLV offset field 365 may be set based on the type of CFM message, as identified by OpCode field 363. The value stored in TLV offset field 365 may be used to determine the endpoint of data contained in the frame. As an example, when the message is a CCM message, TLV offset field 365 may be set to "70."

In addition to the common fields 361, 362, 363, 364, frame 300 may include a number of other fields specific to the type of message. As shown in FIG. 3, a CCM message may also include a sequence number field 366, a maintenance endpoint identifier field 367 specifying the MEP from which the CCM was transmitted, and a maintenance association identifier field 368 specifying the maintenance association to which the transmitting MEP belongs. After data payload 360, frame check sequence 370 may include a number of characters used for error detection and correction in transmission of frame 300.

Figure 4:
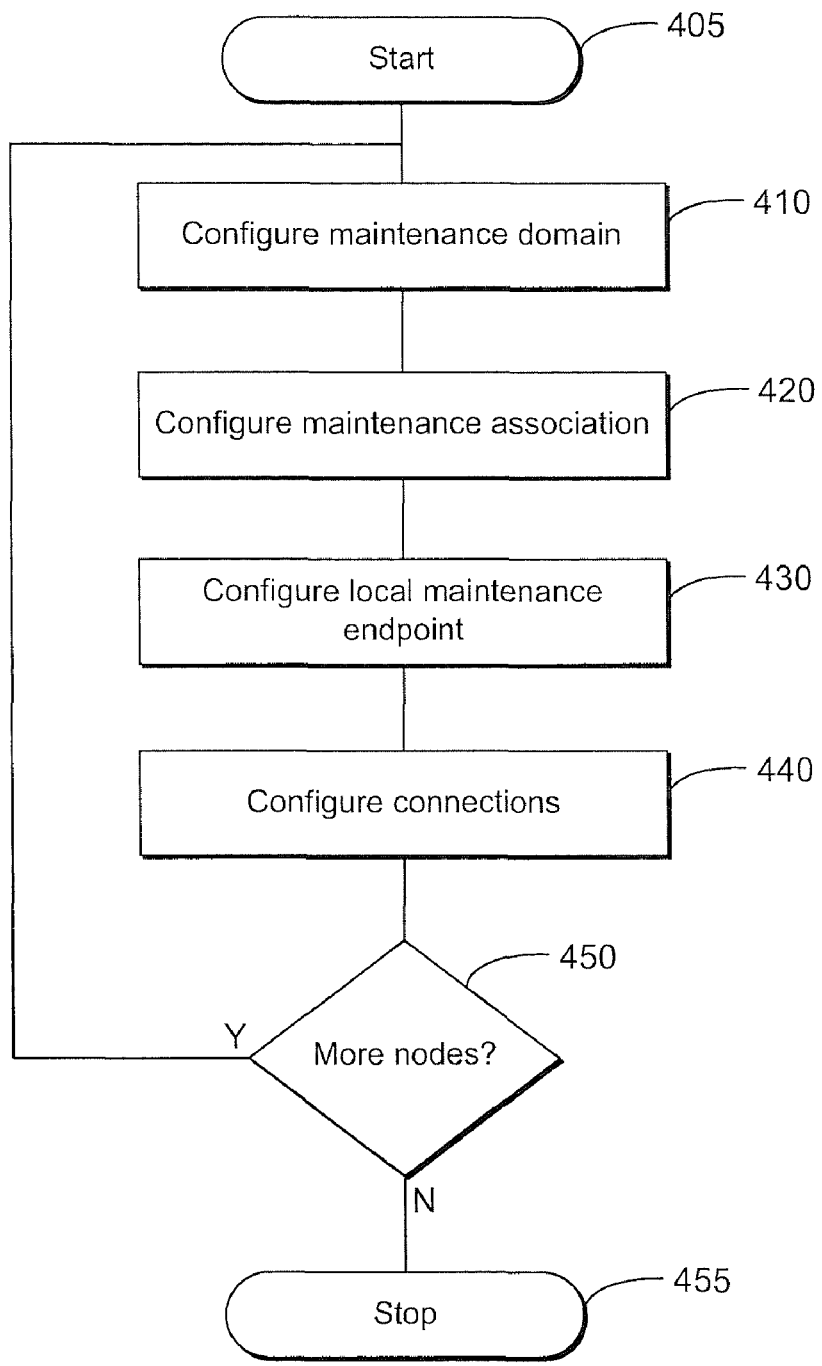
FIG. 4 is a flow diagram of an exemplary method of configuring Ethernet CFM.

FIG. 4 is a flow diagram of an exemplary method 400 of configuring Ethernet CFM. The processing described in method 400 may be performed in node 200 to implement CFM functionality in the node and, more particularly, to implement point-to-point functionality between maintenance endpoints.

Method 400 starts in step 405 and proceeds to step 410, where a maintenance domain is configured on node 200. Method 400 then proceeds to step 420, where a maintenance association is configured within the maintenance domain on node 200. Next, method 400 proceeds to step 430, where a local maintenance endpoint is configured on node 200 within the maintenance association established in step 420.

After configuring the domain, association, and local MEP on node 200, method 400 proceeds to step 440, where connections between the local MEP and remote maintenance endpoints are configured. As described in further detail below with reference to FIG. 5, a given connection may be established as point-to-point by providing the MAC address of the remote MEP during configuration or dynamically determining the MAC address upon receipt of a CFM message from the remote MEP.

In decision step 450, it is determined whether there are additional nodes for which connections between MEPs must be configured. When there are additional nodes for which configuration is necessary, method 400 returns to step 410, where the process is repeated for the new node. Alternatively, when all nodes have been configured, method 400 proceeds to step 455, where method 400 stops.

Figure 5:
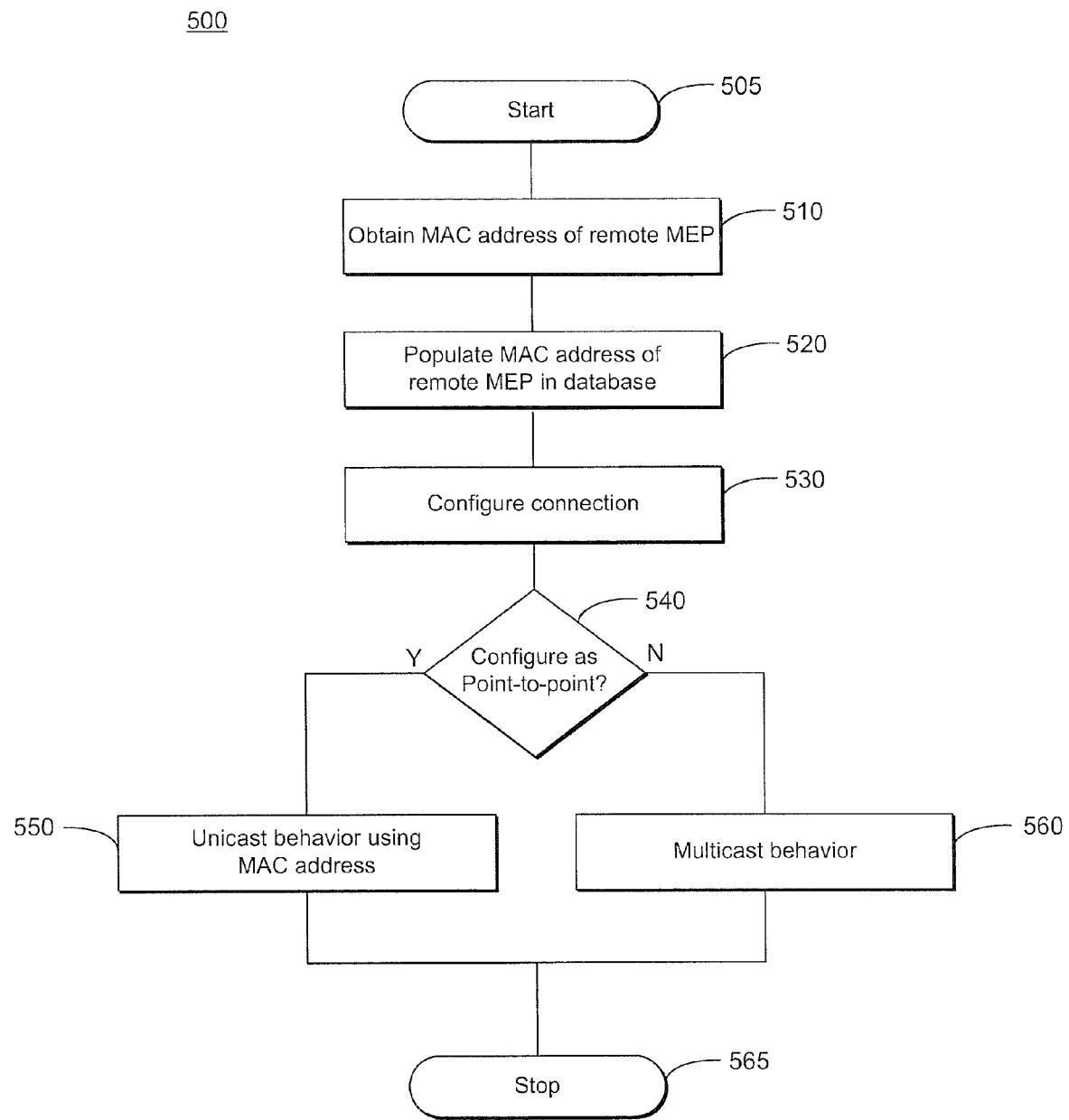
FIG. 5 is a flow diagram of an exemplary method of configuring a connection between two maintenance endpoints.

FIG. 5 is a flow diagram of an exemplary method 500 of configuring a connection between two maintenance endpoints. Method 500 may correspond to the detailed processing performed in establishing, in a node 200, a connection between a local MEP and a remote MEP, as described above in connection with step 440 of FIG. 4.

Exemplary method 500 starts in step 505 and proceeds to step 510, where node 200 obtains the MAC address of the remote MEP. The MAC address may be obtained from the user during configuration of the point-to-point connection. Alternatively, the MAC address of the remote MEP may be determined upon receipt of a CFM message from the remote MEP by, for example, extracting the source address from the PDU used to transmit the CFM message. Upon determination of the MAC address in step 510, method 500 proceeds to step 520, where the MAC address is stored in configuration storage 230 and, more particularly, in MAC addresses 234.

Method 500 then proceeds to step 530, where a command for configuration of a connection is received, and to decision step 540, where node 200 determines whether the connection is to be configured as point-to-point. When it is determined that the connection is to be configured as point-to-point, node 200 enables unicast behavior for the connection. As described in further detail below with reference to FIG. 6, unicast messages may then be sent from the local MEP to the destination MEP. After enabling unicast behavior for the connection, method 500 proceeds to step 565, where method 500 stops.

In contrast, when it is determined in decision step 540 that the connection is not to be configured as point-to-point, method 500 proceeds to step 560, where multicast behavior is used. In particular, CFM messages sent from the local MEP to the remote MEP are sent using a multicast address for which the remote MEP receives messages. Method 500 then proceeds to step 565, where method 500 stops.

Figure 6:
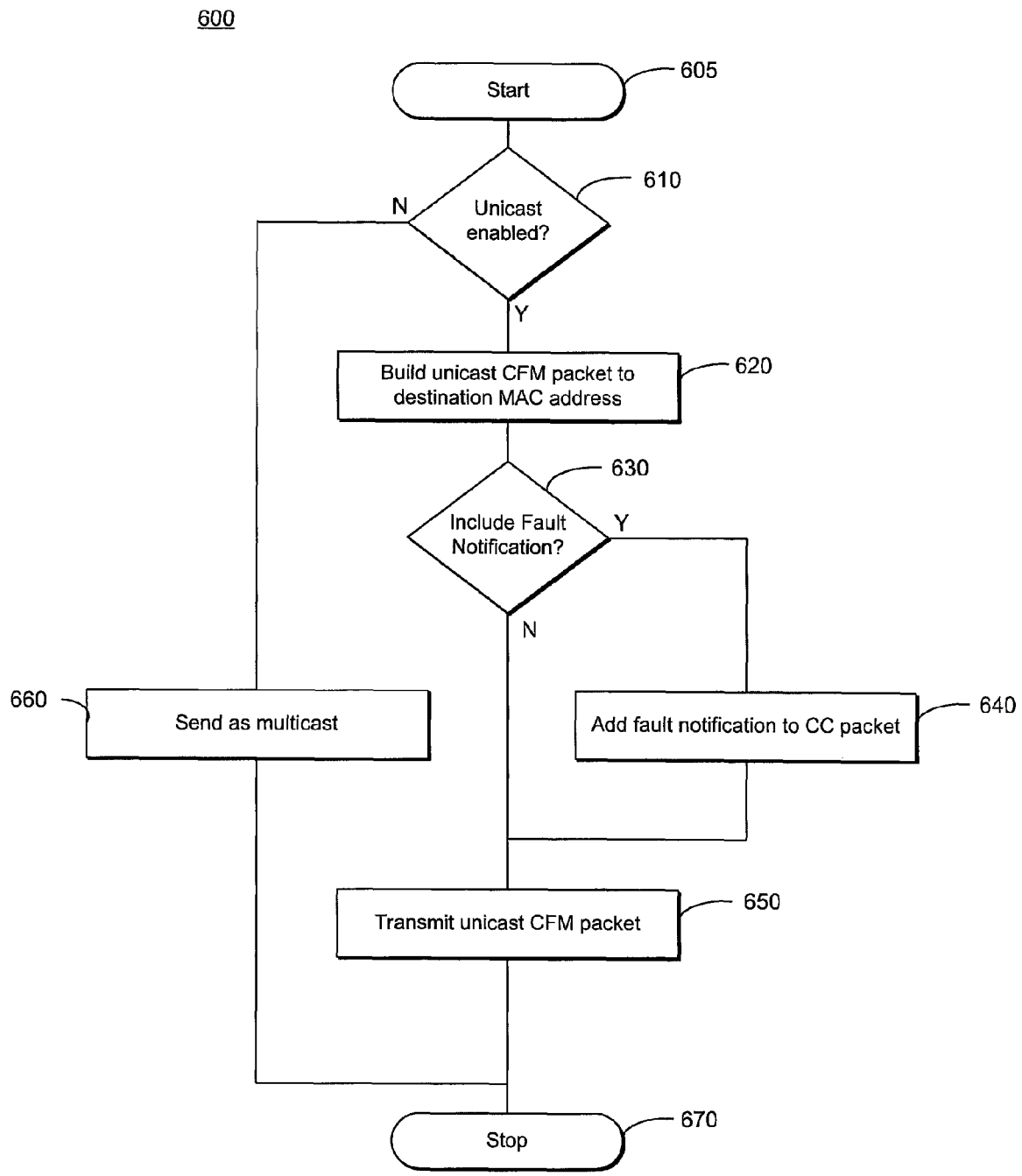
FIG. 6 is a flow diagram of an exemplary method performed by a maintenance endpoint in transmitting a CFM message.

FIG. 6 is a flow diagram of an exemplary method 600 performed by a maintenance endpoint in transmitting a CFM message. The processing described in method 600 may be performed in node 200 to transmit a CFM message between a local MEP in node 200 and a remote MEP located at another node.

Exemplary method 600 starts in step 605 and proceeds to decision step 610, where node 200 determines whether unicast functionality is enabled for the particular connection. Node 200 may make this determination by, for example, determining whether MAC addresses 234 in configuration storage 230 has an entry corresponding to the remote MEP ID of the remote MEP.

When, in decision step 610, node 200 determines that unicast is enabled for the connection, method 600 proceeds to step 620, where node 200 builds a unicast CFM message destined for the remote MEP, using the MAC address associated with the remote MEP as the destination address of the packet. As an example, node 200 may build a connectivity check message using format of frame 300, described above in connection with FIG. 3.

Method 600 then proceeds to decision step 630, where node 200 determines whether to include a fault notification in the CFM message. When node 200 determines that a fault notification should be included, method 600 proceeds to step 640, where node 200 adds a fault notification to the packet. As an example, when the CFM message is a CCM, node 200 may mark the Remote Defect Indication bit in the message to "1." Method 600 then proceeds to step 650. Alternatively, when, in decision step 630, it is determined that a fault notification should not be added to the message, method 600 proceeds directly to step 650.

In step 650, node 200 transmits the unicast CFM message to the remote MEP. In particular, transmitter 240 of node 200 outputs the message toward the unicast MAC address of the remote MEP. Method 600 then proceeds to step 670, where method 600 stops.

Alternatively, when, in decision step 610, node 200 determines that unicast functionality is not enabled for the particular connection, method 600 proceeds to step 660, where node 200 sends the message as a multicast message to a group of maintenance endpoints of which the remote MEP is a member. Method 600 then proceeds to step 670, where method 600 stops.

Figure 7:
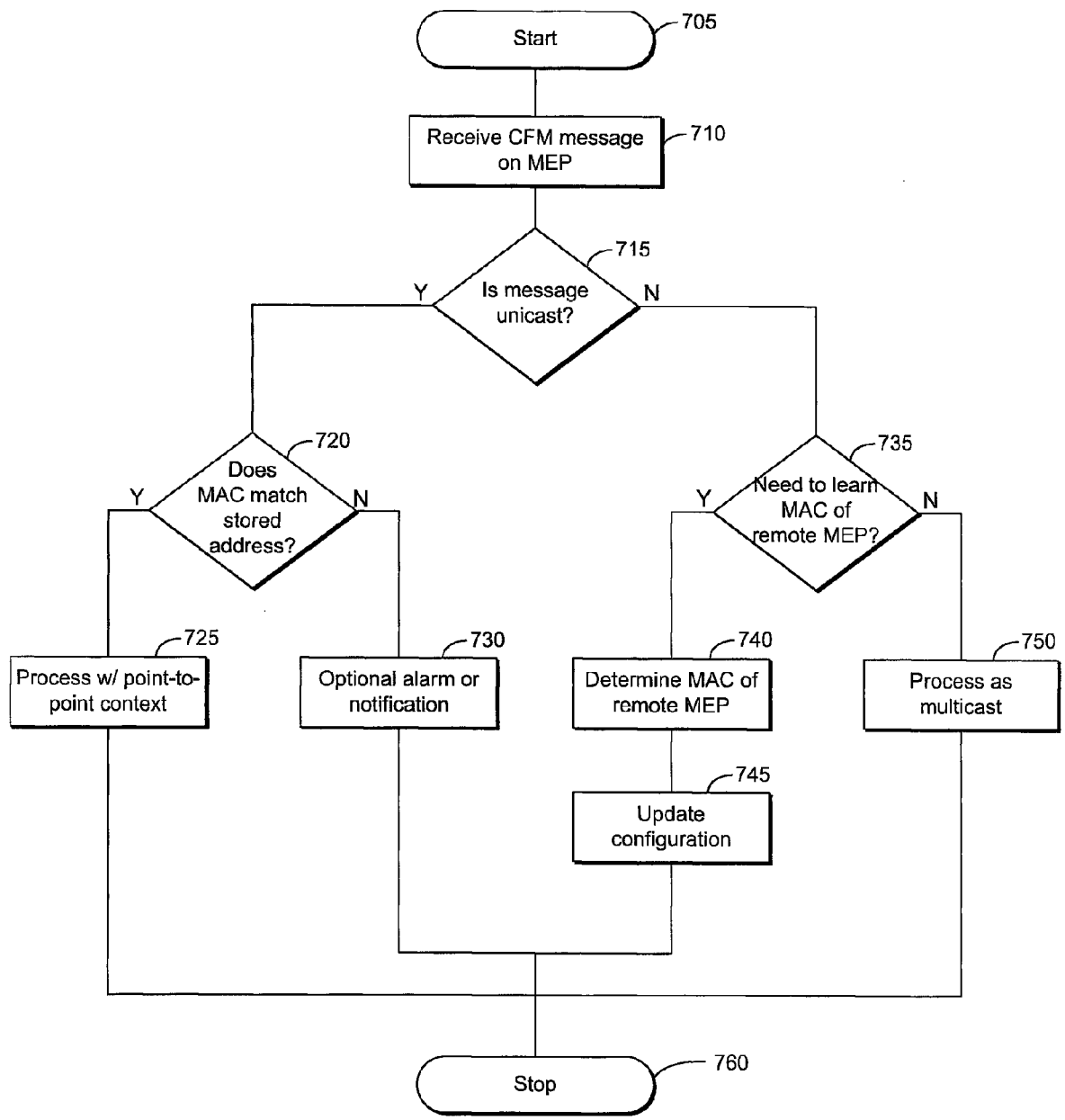
FIG. 7 is a flow diagram of an exemplary method performed by a maintenance endpoint in receiving a CFM message.

FIG. 7 is a flow diagram of an exemplary method 700 performed by a maintenance endpoint in receiving a CFM message. The processing described in method 700 may be performed in node 200 to process a CFM message received from a remote MEP located at another node.

Exemplary method 700 starts in step 705 and proceeds to step 710, where node 200 receives the CFM message from the remote MEP. Method 700 then proceeds to decision step 715, where node 200 determines whether the message is unicast. Node 200 may make this determination by, for example, inspecting the MAC address contained in the destination address field of the message.

When is it determined in decision step 720 that the message is unicast, method 700 proceeds to decision step 720. In decision step 720, node 200 determines whether the source MAC address of the message matches the MAC address stored for the remote MEP in configuration storage 230. This determination may be made, for example, by determining the MAC address stored in association with the remote MEP ID in MAC addresses 234 of configuration storage 230.

When is determined in decision step 720 that the MAC addresses match, method 700 proceeds to step 725, where the CFM message is processed as point-to-point. In particular, node 200 may process the message with the knowledge that the contents are tailored to node 200. As an example, this may allow node 200 to implement Automatic Protection Switching upon recognition of a value of "1" in the Remote Defect Indication bit of the message. In such a case, the node 200 may determine that a working link has failed and automatically implement a switch to a protection link. Other suitable uses of the point-to-point context will be apparent to those of skill in the art.

When, on the other hand, node 200 determines in decision step 720 that the MAC addresses do not match, method 700 proceeds to step 730. In step 730, node 200 may optionally raise an alarm or other notification indicating that the MAC address in the message and the MAC address associated with the remote MEP are different. This could be a result of a number of factors, such as a transmission error or improper assignment of the source MAC address in the message by the remote MEP. After processing as point-to-point in step 725 or raising an alarm or other notification in step 730, method 700 proceeds to step 760, where method 700 stops.

Alternatively, when it is determined in decision step 715 that the message is not unicast (i.e. is multicast), method 700 proceeds to decision step 735, where node 200 determines whether it needs to learn the MAC address of the remote MEP. This determination may be made, for example, by determining whether there is an entry in MAC addresses 234 of configuration storage 230 corresponding to the remote MEP identifier contained in the CFM message.

When node 200 determines that it needs to learn the MAC address of the remote MEP, method 700 proceeds to step 740, where node 200 determines the MAC address of the remote MEP. As an example, node 200 may extract the MAC address from the source address field of the CFM message.

Method 700 then proceeds to step 745, where configuration storage 230 is updated. In this step, node 200 may store the MAC address of the remote MEP in MAC addresses 234 in association with the remote MEP ID of the remote MEP. In addition, node 200 may perform the processing described above in connection with FIG. 4, such that a point-to-point connection is automatically established between a local MEP in node 200 and the remote MEP. Method 700 then proceeds to step 760, where method 700 stops.

Alternatively, when, in decision step 735, node 200 determines that the MAC address of the remote MEP is already known, method 700 proceeds to step 750, where the CFM message is processed as a multicast message. Method 700 then proceeds to step 760, where method 700 stops.

According to the foregoing, various exemplary embodiments simplify the configuration necessary to implement point-to-point Connectivity Fault Management messaging between maintenance endpoints. In particular, by allowing configuration of point-to-point connections using a unicast MAC address of the remote MEP, various exemplary embodiments reduce the amount of time and memory required to establish and maintain these point-to-point connections. As a result, an operator may advantageously use point-to-point functionality to implement desirable features, such as Ethernet Automatic Protection Switching.

It should be apparent from the foregoing description that various exemplary embodiments may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method of configuring Ethernet connectivity fault management (CFM) in a network including a plurality of nodes, the method comprising:
configuring a maintenance domain on a first network node;
configuring a maintenance association within the maintenance domain on the first network node;
configuring, within the maintenance association, a local maintenance endpoint (MEP) on the first network node;
establishing a point-to-point connection within a single maintenance association, the point-to-point connection established between the local MEP and a remote MEP on a network node of the plurality of network nodes using an identifier of the remote MEP and a source Media Access Control (MAC) address of the remote MEP in a configuration storage;
processing a unicast CFM message received from the remote MEP after a source MAC address of the received unicast CFM message matches a source MAC address stored for the remote MEP in the configuration storage; and
generating a CFM message for unicast transmission to the remote MEP, the CFM message including at least one field containing information tailored to the remote MEP; and
transmitting the CFM message over the point-to-point connection corresponding to the remote MEP.

2. The method of claim 1, further comprising:
a user inputting the source MAC address of the remote MEP during configuration of the point-to-point connection.

3. The method of claim 1, further comprising:
determining, with the local MEP, the source MAC address of the remote MEP upon receipt of a CFM message from the remote MEP.

4. The method of claim 3, further comprising:
extracting the source MAC address from a protocol data unit (PDU) used to transmit the CFM message from the remote MEP to the local MEP.

5. The method of claim 1, wherein the identifier is a remote MEP identifier of the remote MEP.

6. The method of claim 1, further comprising:
configuring the maintenance domain on the network node;
configuring the maintenance association within the maintenance domain on the network node;
configuring, within the maintenance association, the remote MEP on the network node; and
establishing the point-to-point connection between the local MEP and the remote MEP on the network node using an identifier of the local MEP and a source MAC address of the local MEP.

7. The method of claim 1, further comprising:
configuring the maintenance domain on the network node;
configuring the maintenance association within the maintenance domain on the network node;
configuring, within the maintenance association, the remote MEP on the network node; and
establishing point-to-point connections between the remote MEP and all other MEPs on the plurality of network nodes.

8. The method of claim 1, wherein the at least one field containing information tailored to the remote MEP includes a Remote Defect Indication (RDI) bit set to a value "1."

9. The method of claim 8, further comprising:
in response to receipt of the CFM message including the RDI bit set to the value "1," the remote MEP implements Automatic Protection Switching (APS) to switch to a protection link.

10. A network node implementing Ethernet connectivity fault management (CFM), the network node comprising:
a configuration storage that maintains CFM configuration information; and
a configuration module that executes instructions to configure a maintenance domain, configures a maintenance association within the maintenance domain, configures, within the maintenance association, a local maintenance endpoint (MEP), establishes a point-to-point connection within a single maintenance association, the point-to-point connection established between the local MEP and a remote MEP using an identifier of the remote MEP and a source Media Access Control (MAC) address of the remote MEP, updates the configuration storage to reflect the configuration of the maintenance domain, the maintenance association, the local maintenance endpoint, and the point-to-point connection, processes a unicast CFM message received from the remote MEP after a source MAC address of the received unicast CFM message matches a source MAC address stored for the remote MEP in the configuration storage, and executes instructions to generate a CFM message for unicast transmission to the remote MEP, the CFM message including at least one field containing information tailored to the remote MEP.

11. The network node according to claim 10, further comprising:
an interface that receives the source MAC address of the remote MEP from a user during configuration of the point-to-point connection.

12. The network node according to claim 10, wherein the configuration module determines the source MAC address of the remote MEP upon receipt of a CFM message from the remote MEP.

13. The network node according to claim 12, wherein he configuration module extracts the source MAC address from a PDU used to transmit the CFM message from the remote MEP to the local MEP.

14. The network node according to claim 10, wherein the identifier is a remote MEP identifier of the remote MEP.

15. The network node according to claim 10, further comprising:
a transmitter that transmits the CFM message over the point-to-point connection corresponding to the remote MEP.

16. The network node according to claim 15, wherein the at least one field containing information tailored to the remote MEP includes a Remote Defect Indication (RDI) bit set to a value "1."

17. The network node according to claim 16, wherein, in response to receipt of the CFM message including the RDI bit set to the value "1," the remote MEP implements Automatic Protection Switching (APS) to switch to a protection link.

18. The network node according to claim 10, wherein the CFM message is a Continuity Check Message (CCM).

* * * * *